United States Patent [19]

Bouldin

[11] 4,418,881
[45] Dec. 6, 1983

[54] RUDDER CONTROL GUST LOCK

[75] Inventor: Clarence C. Bouldin, Orange, N.J.

[73] Assignee: C. C. Bouldin Inc., Paterson, N.J.

[21] Appl. No.: 287,392

[22] Filed: Jul. 27, 1981

[51] Int. Cl.³ .......................... B64C 13/14; B64F 1/00
[52] U.S. Cl. .................................... 244/224; 244/1 R
[58] Field of Search ......................... 244/1 R, 224, 87

[56] References Cited

U.S. PATENT DOCUMENTS 3,016,827  1/1962  Boyd ..................................... 244/87
3,288,401  11/1966 Fete ...................................... 244/224
3,971,532  7/1976  Fountain ............................. 244/1 R

OTHER PUBLICATIONS

*Ramp and Hangar Equipment for the Airlines*, Aircraft Mechanics Inc., Colorado Springs, Colorado, page marked 25 and facing page parts #'s A60170 and A60177.

*Primary Examiner*—Charles E. Frankfort
*Assistant Examiner*—Rodney Corl
*Attorney, Agent, or Firm*—David A. Jackson

[57] ABSTRACT

A rudder gust control lock device is disclosed for securing the rudder and vertical stabilizer of single and twin engine airplanes to each other. The device includes a partial collet having a substantially U-shaped cross section and paired opposed flanges that extend from the extremities of the collet in a direction transverse to its longitudinal dimension. The collet is adapted to receive a leading edge of the rudder, and the flanges are adapted to slidably engage the adjacent surfaces of the stabilizer when the device is shifted along the rudder. A handle is included, that is attached to one of the flanges and extends in substantially the same direction as that flange, to enable the operator to grasp the device during installation and removal. A flag is also included, attached to the handle, to serve as a warning and reminder to the operator that the device is in position.

9 Claims, 7 Drawing Figures

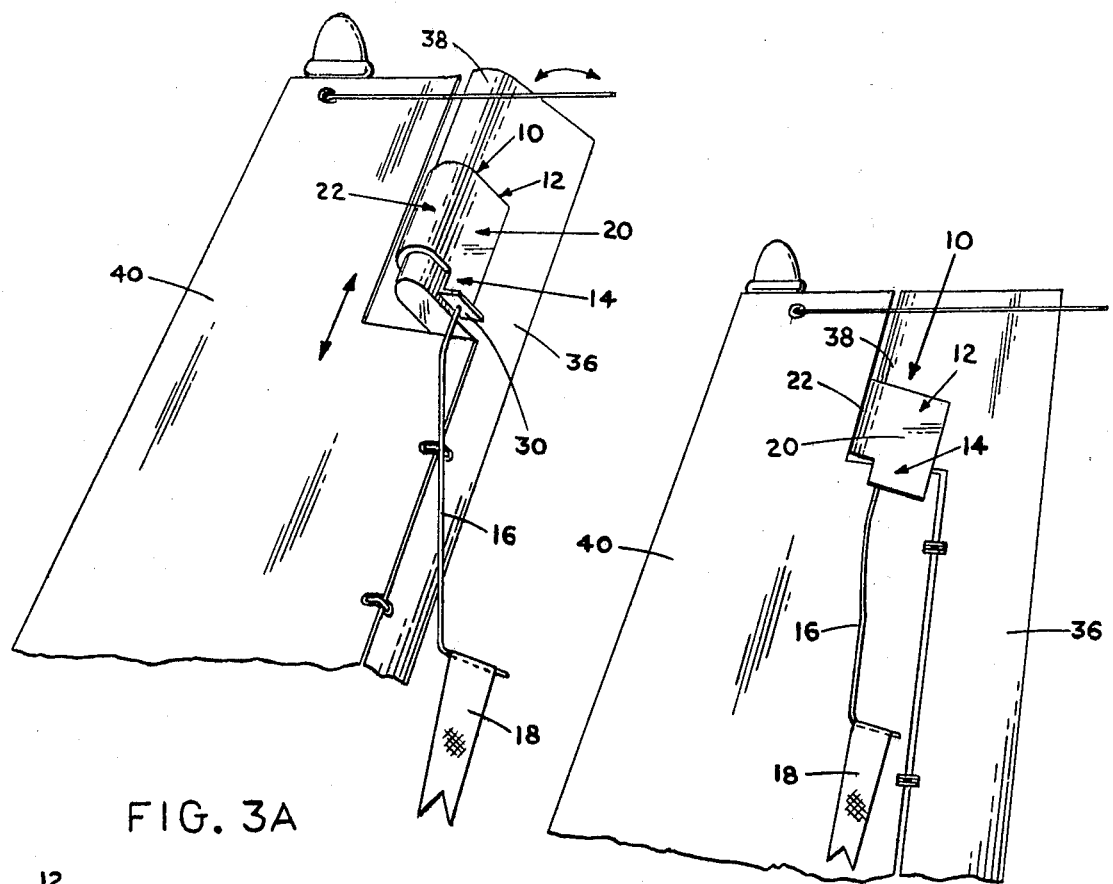
FIG. 3A
FIG. 3B
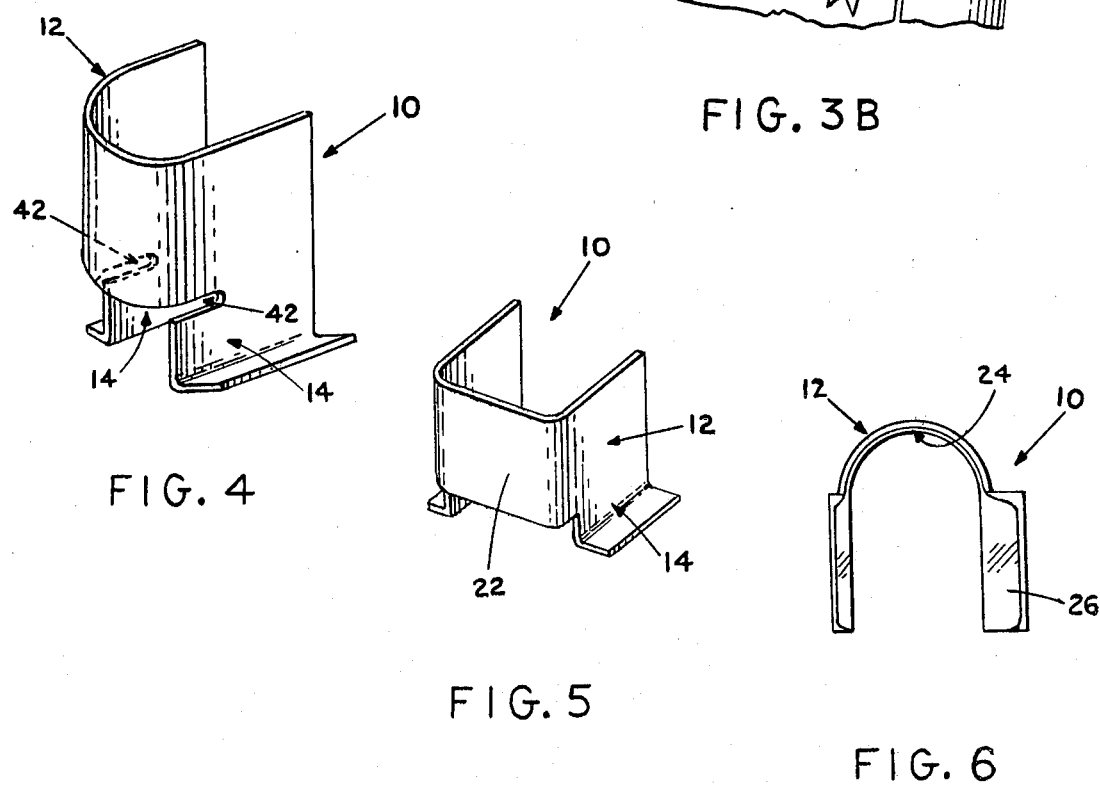
FIG. 4
FIG. 5
FIG. 6

RUDDER CONTROL GUST LOCK

BACKGROUND OF THE INVENTION

1. Field of the Invention

The present invention relates to devices useful for securing airplanes when not in use, and more particularly to such devices for preventing the movement of the rudder of an airplane being stored in an open tie down area.

2. Description of the Prior Art

While commercial aircraft have grown in size and sophistication, the small aircraft designed for up to about three to four passengers, have utilized certain structural features without substantial modification. In particular, the vertical stabilizer and rudder constructions of these lighter planes, such as those manufactured by the Cessna Corporation, have relied on a rudder that though under spring tension, is free to pivot in relation to the vertical stabilizer, when the airplane is not in use. While such construction is not the rule, as alternate small plane constructions utilize direct association between the nose wheel assembly and the rudder, so that, once the airplane lands and is positioned on the ground, the nose wheel directly maintains the rudder stationary.

In the construction first mentioned above, that of the relatively free movement of the rudder when the aircraft is on the ground, certain difficulties develop when such aircraft is stored in open spaces, such as a tie down area. For example, during such storage, inclement weather including high winds can cause the rudder to pivot violently and may result in the dislodgement of the rudder from the stabilizer which may further, damage the stabilizer as well.

Numerous approaches have been taken to immobilize the rudder, including wedges, ropes, and other devices to hold the rudder fast against the stabilizer. For example, a plate-like device having a generally H-shaped cross section is known that is friction fitted along the adjacent horizontal edges of the rudder and the stabilizer. This type of device, however, possesses certain drawbacks, in that jamming between the stabilizer and the rudder with resulting damage to both can occur. Also, the positioning of the device in this unobtrusive manner frequently results in failure by the aircraft operator to recall that the device is in position, with the result that the rudder is damaged when an attempt is made to operate the airplane.

It is therefore desirable to develop a device which is easily installed and removed, and which minimizes the possibility of damage to the rudder and vertical stabilizer from either jamming of the device or failure to remove the device before operation of the airplane.

SUMMARY OF THE INVENTION

In accordance with the present invention, a device for releasably securing the rudder and vertical stabilizer of an airplane to each other is disclosed which comprises a partial collet having a generally U-shaped cross section that is adapted to slidably seat on the forwardmost leading edge of the rudder, and paired opposed flanges extending from the partial collet generally transfer to its longitudinal dimension, to slidably engage the broad surfaces of the stabilizer adjacent the vertical leading edge of the rudder. A handle for installing and removing the present device from the rudder of the airplane may be included, and is attached to one of the flanges. The handle may be rod-like in shape and may include at its end furthest removed from the device, a warning flag or other appropriate indicia, to serve as a reminder to the operator of the airplane that the device is in position.

In a preferred embodiment, the present device is prepared as an integral unit, with the partial collet comprising a generally U-shaped strap having paired substantially parallel legs. The flanges may be integral with the legs and extend in the same direction, transverse to the longitudinal dimension of the collet to define two parallel surfaces that may be slip fitted over the adjacent broad surfaces of the stabilizer. One of the flanges may define at its extremity an outwardly extending rim, to which may be attached a rod-like handle for grasping and manipulating the device during the installation and removal from the rudder and stabilizer of the airplane.

The device is particularly suited for rudder and stabilizer assemblies of counterbalance construction, wherein the collet is disposed upon the leading vertical edge of the rudder, after which the rudder is aligned with the stabilizer and the device is then lowered to permit the flanges to slidably receive the adjacent broad surfaces of the vertical stabilizer.

The present device may be provided with a resilient coating or padding on the surfaces thereof that slidably engage the rudder and the vertical stabilizer, to prevent damage to painted areas. The handle may have attached distally thereto a warning flag appropriately sized and colored to serve as a constant reminder to the operator of the airplane that the device is installed, and that the rudder is therefore locked.

Accordingly, it is a principal object of the present invention to provide a device for securing the rudder and the vertical stabilizer of an airplane to each other when the airplane is in storage.

It is a further object of the present invention to provide a device as aforesaid which may be simply manufactured and easily used.

It is a yet further object of the present invention to provide a device as aforesaid which may be installed without friction fitting, and is easily noticeable when in position.

Other objects and advantages will become apparent to those skilled in the art from a consideration of the ensuing description which proceeds with reference to the following accompanying drawings.

BRIEF DESCRIPTION OF THE DRAWINGS

FIG. 3a is a side fragmentary elevational view illustrating the device of the present invention engaging the rudder of an airplane prior to securing the rudder to the vertical stabilizer.

FIG. 3b is a side fragmentary perspective view similar to FIG. 3a, illustrating the device of the present invention securing the rudder to the vertical stabilizer.

FIGS. 4 and 5 are perspective views illustrating alternate embodiments of the device of the present invention.

FIG. 6 is a bottom plan view similar to FIG. 2, illustrating a further alternate embodiment of the present invention.

DETAILED DESCRIPTION

Figure 1:
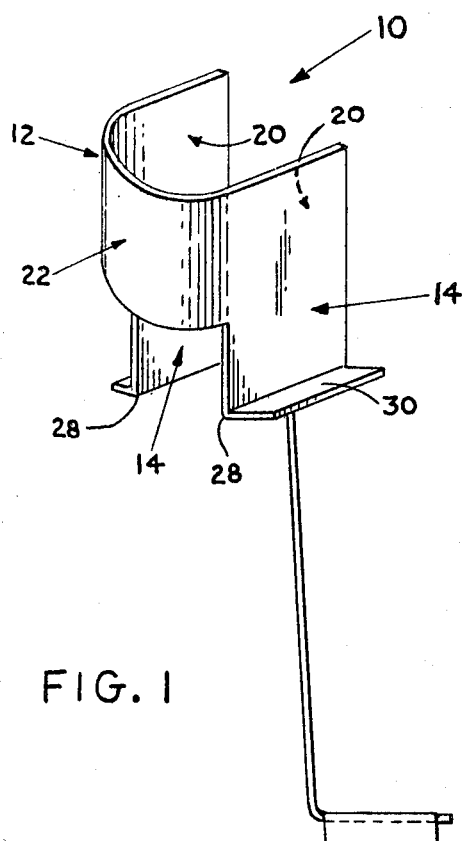
FIG. 1 is a perspective view illustrating the device of the present invention.

The present invention relates to a device serving to secure the rudder and the vertical stabilizer of a small airplane to each other. As illustrated in the Figures, wherein like numerals designate like parts, and particularly FIG. 1, the present device 10 is illustrated in perspective, and comprises a partial collet 12 having a generally U-shaped cross section adapted to receive the forwardmost leading edge of a rudder, as shown in FIGS. 3A and 3B discussed later on herein.

Paired opposed flanges 14 extend from partial collet 12 in a direction generally transverse to the longitudinal dimension of partial collet 12, to slidably engage and receive the broad surfaces of the stabilizer, disposed adjacent the vertical leading edge of the rudder.

The present device includes a handle 16 useful for installing and removing the device from the rudder. Handle 16 is attached to one of the flanges. Handle 16 preferably extends away from collet 12 in the same general direction of extension as the flange 14 to which it is attached. A flag 18 may be attached to handle 16 as illustrated, to serve as a warning or reminder to the operator of the airplane that the device is in position on the rudder.

Referring to the Figures in greater detail, collet 12 may be prepared from an essentially planar strap of material which is bent in an essentially U-shape to define paired legs 20 which preferably are disposed in parallel relation to each other. Legs 20 are connected by saddle 22 which is preferably integral therewith. Flanges 14 are preferably stationary and integral with collet 12, and in particular, comprise planar, parallel extensions of legs 20 as shown. Thus, flanges 14 extend from legs 20 in a direction generally perpendicular to the longitudinal dimensions of the legs, to provide the parallel retaining surfaces to secure the vertical stabilizer as described later herein.

Figure 2:
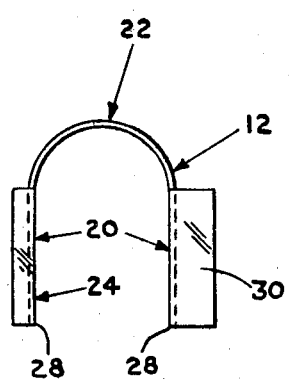
FIG. 2 is a bottom plan view of the device shown in FIG. 1.

Referring now to FIG. 2, a bottom plan view of the present device reveals that legs 20 and saddle 22 cooperate to define an inner surface 24 that makes surface contact with the rudder and stabilizer. In a further embodiment of the present invention, illustrated in FIG. 6, the inner surface 24 of device 10 may be provided with a coating or lining 26, extending throughout the area of partial collet 12, as well as flanges 14, to assure that the device 10 does not mar the surface of either the rudder or the stabilizer, both of which are frequently either painted metal or plastic coated. The selection of a particular coating material or padding is within the skill of the art, and does not, per se, form a part of the present invention. The invention is therefore intended to embrace a variety of suitable materials within its scope.

Referring to FIGS. 1 and 2, flanges 14 may be flared at the outer extremities thereof furthest removed from collet 12. Thus, flanges 14 may define one or more flared edges 28 at the free ends thereof. The flared edge 28 of each flange extends in a direction away from the other flange, to provide a land for the smooth reception of the rudder and stabilizer surfaces when the device 10 is placed thereon. Preferably, both the flanges 14 define flared edges 28 extending away from each other, to provide a mouth-like reception for the outer surfaces of the rudder and stabilizer. More preferably, coating or liner 26 may extend over flared edges 28 to assure a smooth and scratch-free travel of device 10 over the rudder and stabilizer surfaces.

Referring further to FIG. 2, one of the flanges 14, as mentioned earlier, has attached thereto a mounting handle 16 to facilitate the installation and removal of device 10 from the rudder and stabilizer of the airplane. In one embodiment of the invention, the flange 14 to which handle 16 is attached, defines a tab 30 to which handle 16 may be attached. The provision of handle 16 in attachment to tab 30 facilitates the disposition of handle 30 apart and away from the surface of the stabilizer and rudder, so that handle 16 may be more readily visible and more easily reached by the operator of the airplane. This first advantage is particularly important, as the handle 16 has attached to it the flag 18, for the purpose of providing a visible warning and reminder to the operator, even in the instance where the operator has climbed into the airplane cockpit without checking the rear of the airplane. Naturally, however, the provision of tab 30 and the attachment of handle 16 thereto is but one construction, and while preferred, does not constitute the sole operative embodiment of the present invention.

Referring further to FIG. 1, handle 16 is shown to be an essentially rod-like structure of a determinate length. Naturally, handle 16 may be of any variant shape, so long as it extends to a length suitable for grasping and manipulation of device 10 by the operator of the airplane, so that installation and removal of device 10 is possible. In the present Figures, handle 16 is shown to be rod-like and at the end furthest removed from flange 14, defines a bend 32 therein from which extends a flag support 34. Flag support 34 may also serve as part of handle 16, for the operator to grasp and control during the installation and removal of device 10. Flag support 34 is so positioned that when device 10 is installed, it extends substantially horizontally, to permit flag 18 to drape vertically downwardly therefrom.

Referring now to FIGS. 3A and 3B, the installation and removal of device 10 is illustrated. In FIG. 3A, device 10 is shown in the initial position mounted upon an appropriate rudder 36. In particular, device 10 has been slidably positioned against the forwardmost leading edge 38 of rudder 36, in such manner that flanges 14 reside above the junction between rudder 36 and stabilizer 40. In the instance where the rudder 36 and stabilizer 40 are already in alignment as shown in FIG. 3B, the operator need only pivot the stabilizer 36 into the position shown in FIG. 3A, and holding device 10 with handle 16 in the essentially perpendicular position, thrust device 10 gently against leading edge 38 until full reception thereof is achieved.

Installation of device 10 is completed by the rotation of rudder 36 into a position of alignment with stabilizer 40, as shown in FIG. 3B, and by the subsequent sliding of device 10 downward, so that flanges 14 engage the adjacent outer surfaces of stabilizer 40 as shown. In this way, flanges 14 secure rudder 36 in a position of alignment with stabilizer 40, that will withstand all pivoting forces placed upon the rudder, such as excessive wind gusts and the like.

Removal of the device 10 is easily accomplished by reversing the installation steps discussed above. Thus, the operator need only grasp handle 16 and thrust the device 10 upward, so that flanges 14 disengage the outer surfaces of stabilizer 40. Thereafter, the operator pivots rudder 36 into a position such as that shown in FIG. 3A, and applies gentle forward pressure on handle 16 to cause device 10 to slide away from and to disengage rudder 36 entirely.

The device of the present invention is particularly useful for airplanes having a stabilizer constructed as shown in FIGS. 3A and 3B. Certain modifications, however, to the present device may be made, within the scope of the present invention to accommodate slight variations in construction.

Referring now to FIG. 4, the present device may be provided with slightly extended flanges 14, which attempt to provide a greater surface area for connection of the stabilizer and the rudder. In particular, such extensions, in the instance where the partial collet 12 is of a strict U-shape, are most advantageously achieved by the provision of notches 42 or other separations between flanges 14 and legs 20. Notches 42 extend primarily from the point at which saddle 22 is defined, so that flanges 14 can continue in essentially parallel relation to each other.

As mentioned earlier, device 10 may be provided with further flared edges to facilitate installation and removal from the surface of rudder 36. In particular, the edge of partial collet 12 furthest removed from flanges 14 may be rounded or slightly flared in a manner not specifically illustrated, about the longitudinal edge of partial collet 12 disposed furthest from flanges 14, to define a gradual entrance or mouth for the smooth reception of the surface of the rudder 36. As with the flared edges 28, this flared edge may be provided with a coating or liner 26, to prevent scratching of the outer surfaces of the rudder.

While the present invention has proceeded with reference to illustrations of a partial collet having a generally U-shaped cross section, defined by an essentially rounded saddle 22, the provision of a saddle of variant shape is also within the scope of the present invention. Referring now to FIG. 5, a device is illustrated wherein the saddle 22 is essentially planar, and the collet 12 defines an essentially squared or rectangular shape. Naturally, this shape is provided for accommodation of rudders having similarly shaped leading edges, or in the instance where the device 10 is to be installed between the rudder and stabilizer, in a position other than that shown in the present Figures.

The present device may be prepared from a variety of materials suitable for the intended purpose. Thus, the partial collet and associated flanges may be prepared from various metals or high impact plastic materials by manufacturing techniques suited for the respective material contemplated. Thus, metals may be cut into strips and bent to the appropriate shape, cast or forged; various plastics may be injection molded, stamped, or otherwise thermoformed. The liner or coating may comprise a resilient paint and may be applied by spraying, dipping or the like; thus, the device may be assembled and thereafter dipped into a liquid elastomer, which upon solidifying, will provide a resilient surface suitable to prevent the device from scratching the outer surfaces of the rudder and stabilizer of the airplane.

While there have been herein shown and described the preferred embodiments of the present invention, it will be understood that the invention may be embodied otherwise than as herein specifically illustrated or described, and that within such embodiment certain changes in the detail and construction, and the form and arrangement of the parts may be made without departing from the underlying idea or principles of the invention within the scope of the appended claims.

What is claimed is:

1. A device for releasably securing the rudder and the vertical stabilizer of an airplane to each other, comprising:
   (a) a partial collet having a generally U-shaped cross section with an inner surface adapted for wraparound reception of the forward most vertical leading edge of said rudder, said collet adapted to slidably seat on said forward most vertical leading edge and to slide in the vertical direction therealong; and
   (b) paired, opposed flanges extending from said partial collet, in a direction generally transverse to the plane of said U-shaped cross section, said flanges adapted to slidably engage the broad surfaces of said stabilizer adjacent said forwardmost vertical leading edge, upon sliding of said partial collet in the vertical direction, to maintain said rudder and said stabilizer in planar stationary alignment when said airplane is not in use.

2. The device of claim 1 wherein said partial collet comprises paired generally parallel legs, and a saddle extending therebetween.

3. The device of claim 1 wherein said flanges are stationary and integral with said partial collet.

4. The device of claim 2 wherein said flanges extend from said legs in a direction generally perpendicular to their longitudinal dimensions.

5. The device of claim 1 wherein at least one of said flanges is flared away from the other at the end of said flange furthest removed from said partial collet.

6. The device of claim 5 wherein both of said flanges are flared in directions away from each other.

7. The device of claim 1 including a mounting handle attached to one of said flanges, and extending away from said partial collet in the same general direction of extension as the flange to which it is attached.

8. The device of claim 7 wherein a warning flag is attached to said handle.

9. The device of claim 1 wherein said partial collet defines an outer surface and an inner surface, and said inner surface is covered with a material adapted to prevent said partial collet from causing damage to the outer surfaces of said rudder and said stabilizer, when said device is mounted thereon.

* * * * *